UNITED STATES PATENT OFFICE.

ELLIOT Q. ADAMS, OF BERKELEY, CALIFORNIA, AND LOUIS E. WISE, OF NEW YORK, N. Y.

PROCESS OF MAKING PHOTOSENSITIZING-DYES EFFECTIVE FOR INFRA-RED RADIATION.

1,338,349.   Specification of Letters Patent.   Patented Apr. 27, 1920.

No Drawing.   Application filed April 4, 1919. Serial No. 287,630.

(FILED UNDER THE ACT OF MARCH 3, 1883, 22 STAT. L., 625.)

*To all whom it may concern:*

Be it known that we, ELLIOT Q. ADAMS and LOUIS E. WISE, citizens of the United States of America, and employees of the Department of Agriculture, residing in the city of Berkeley, county of Alameda, State of California, and in the city of New York, county of Westchester, State of New York, respectively, (whose post-office addresses are Department of Agriculture, Washington, D. C.,) have invented new and useful Improvements in the Processes of Making Photosensitizing-Dyes Effective for Infra-Red Radiation, of which the following is a specification.

Dyes of this type are known to be substituted ammonium salts, the sensitizing action being due to the positive ammonium radical. Hence the nature of the negative radical will be of influence only in so far as it affects adversely the solubility of the compound or possesses deleterious action of its own. It will therefore be possible to use any quaternary compounds satisfactory in these respects.

This application is made under the act of March 3, 1883, chapter 143 (22 Stat. L., 625), and the invention herein described and claimed may be used by the Government of the United States or any of its officers or employees in the prosecution of work for the Government, and any person in the United States, without payment to us of any royalty thereon.

We have found that these dyes can be obtained directly in a state of sufficient purity by the action of air and of sodium methylate in absolute methyl alcoholic solution upon the quaternary halid or other addition products of $\alpha$, $\gamma$-dimethylated quinolin bases. By $\alpha$, $\gamma$-dimethylated quinolin bases are meant such derivatives of quinolin and related bases as have methyl groups both adjacent and diametrically opposite the nitrogen of the heterocyclic ring.

The same products can be obtained, though less satisfactorily, by the use of other alkalis in diluted methyl alcoholic, in ethyl alcoholic or in aqueous solution.

The following examples will serve to illustrate the preferred procedure. The invention, however, is not confined to these examples. The parts are by weight.

Example 1: 6.54 parts of 2, 4, 6-trimethyl quinolin ethiodid are dissolved in 8 parts of cold absolute methyl alcohol and a solution of sodium methylate, prepared by dissolving 0.23 part metallic sodium in 16 parts absolute methyl alcohol, is added. The mixture is allowed to stand at room temperature approximately 48 hours in an open vessel, during which time the dye separates in the form of green prisms, from which the mother liquor may be siphoned or decanted, and the adhering mother liquor removed by washing with mixtures of methyl alcohol and ethyl ether. Subsequent washing with water to remove small quantities of inorganic material is often advisable.

On longer standing the mother liquors may yield a further amount of the dye.

The use of an impure intermediate leads to the simultaneous formation of dyes of the cyanin and isocyanin types, which may be detected in a spectroscopic examination of the solution by the cyanin and isocyanin absorption maxima near 6000 and 5600° A. U., respectively. The pure material gives an absorption maximum near 6600° A. U.

Example 2: 6.26 parts of 2, 4-dimethyl quinolin ethiodid are dissolved in 64 parts absolute methyl alcohol and very gradually added to a solution of 3.4 parts of silver nitrate in 80 parts of hot absolute methyl alcohol. The precipitate is filtered off by suction. The filtrate is concentrated to half its original volume and cooled to 10° C. A solution of sodium methylate prepared by dissolving 0.23 part metallic sodium in 16 parts absolute methyl alcohol is added and the mixture allowed to stand in a vessel exposed to air for 24 hours. No crystals are formed during this period, but dye formation is indicated by the intense blue-green color of the solution. The mixture is then gradually concentrated at room temperature in a partially exhausted dessicator over calcium chlorid for 48 hours. A crop of brilliant green prismatic crystals is obtained, from which the mother liquor may be siphoned or decanted, or removed by filtration, and the small amount of adhering mother liquor removed by washing with mixtures of methyl alcohol and ethyl ether.

Another crop of crystals can be obtained by cautious further concentration of the mother liquors.

The dyes obtained as described in the examples above are sensitive to heat rays and should be stored in a cool dry place.

Having now fully described our invention, what we claim and desire to protect by Letters Patent is—

1. The process of producing infra-red photographic sensitizing dyes by the interaction of air and of sodium methylate in absolute methyl alcoholic solution with the quaternary halid addition products of $\alpha$, $\gamma$-dimethylated quinolin derivatives.

2. The process of producing infra-red photographic sensitizing dyes by the interaction of air and of sodium methylate in absolute methyl alcoholic solution with the quaternary addition products of $\alpha$, $\gamma$-dimethylated quinolin derivatives.

In testimony whereof, we affix our signatures in the presence of two subscribing witnesses.

ELLIOT Q. ADAMS.
LOUIS E. WISE.

Witnesses:
 Louis A. Mikeska,
 Herbert L. J. Haller.